United States Patent Office 3,813,466
Patented May 28, 1974

3,813,466
WOUND DRESSINGS
Robert J. Anderson, Bloomfield, N.J., assignor to Parachem Corporation, Palisades Park, N.J.
No Drawing. Continuation-in-part of applications Ser. No. 337,709, Jan. 8, 1964, now Patent No. 3,328,259, and Ser. No. 782,515, Dec. 23, 1958, now abandoned. This application May 31, 1967, Ser. No. 642,294
Int. Cl. A61l 15/03, 15/04
U.S. Cl. 424—28                7 Claims

ABSTRACT OF THE DISCLOSURE

The invention comprises a laminated dressing for a wound comprising a primary layer which is readily soluble in plasma and a secondary layer in face adhering contact with the primary layer, also soluble in plasma but to a lesser extent than the primary layer.

---

The present invention relates to dressings for wounds.

The present application is a continuation-in-part of application Ser. No. 337,709 filed Jan. 8, 1964, now matured into Pat. No. 3,328,259 and of Ser. No. 782,515, filed Dec. 23, 1958, and now abandoned.

The aforesaid copending applications disclose a dressing for a wound comprising a flexible body large enough to cover an open lesion as a dressing and containing a water-soluble, plasma-soluble cellulose derivative having hemostatic and film-forming properties and having the property of combining with the plasma in a wound to form with said plasma an artificial water-insoluble eschar. The cellulose derivative is present in integral non-discrete form in said flexible body and in proportions to cause said body to be effective in coagulating the plasma issuing from a moist lesion to which the dressing is applied.

The dressing, for the purpose described, may be in the form of a pad or sheet, and the flexible plasma-soluble body may, for example, consist essentially of a sodium salt of carboxymethyl cellulose or of hydroxy ethyl cellulose, serving as the hemostatic agent. These film-forming compounds, especially when aerated or in porous form, are dramatically effective in quickly coagulating plasma from a flowing wound to which they are applied, and the eschar formed therefrom is readily absorbable in body fluids. However, a dressing, made mainly of these very actively hemostatic compounds, when applied to a free flowing wound, afford little containment, especially when in aerated or porous form. For surface bandages, this can be overcome by casting the dressing body onto a plasma-insoluble, absorbent backing, such as polyurethane foam, which will absorb the excess plasma fluid discharged from the wound. Where the dressing is to be used in body cavities, or for application to internal wounds, where the dressing must be absorbed in the body, the use of a plasma-insoluble backing would be undesirable.

One object of the present invention, is to provide a dressing which is highly hemostatic in its primary action, which affords a substantial degree of containment against excess flow of plasma from a wound to which it is applied, and which is completely absorbable in the body.

To carry out the objective described, the dressing of the present invention comprises a primary body in the form of a pad or sheet, which is quickly soluble in plasma and which is actively hemostatic, and a backing for said body in the form of a sheet, which is also soluble in plasma but to a lesser degree than the body to afford a substantial degree of containment for excess plasma flowing from a wound to which the dressing may be applied.

As a feature of the present invention, the body of the dressing, which is actively hemostatic, is a cellulose derivative, and a suitable compound for the purpose is the sodium salt of carboxymethyl cellulose or hydroxy ethyl cellulose. These compounds are highly active as hemostatic agent, and may be employed in dense or aerated form, according to the degree of hemostatic activity desired. In dense form, these compounds are less active hemostatically, but are still hemostatic, but in aerated or porous form, they are highly hemostatically active, but being porous, will offer very little containment when applied to a free flowing wound, unless applied in bulky form.

The backing employed as a secondary layer in conjunction with the primary hemostatic body described is, desirably, also a cellulose derivative but less soluble in plasma than said body, and a suitable derivative for that purpose is methyl cellulose. This compound in dense form, has little or no hemostatic properties, and in aerated or porous form is hemostatic but to a substantially lesser degree than are the sodium salt of carboxymethyl cellulose or the hydroxy ethyl cellulose in aerated or porous form. However, whether the methyl cellulose is employed as a backing in dense or aerated form, it is soluble in plasma at body temperature, but much more slowly than is the sodium salt of carboxymethyl cellulose or the hydroxy ethyl cellulose in aerated or porous form, and therefore, affords substantial containment against an excess of plasma from a wound to which the dressing is applied, and not coagulated by the main body of the dressing.

Another cellulose derivative that can be used as a backing for the dressing is a compound called hydroxyalkyl ether of cellulose, sold by Hercules Powder Company under the trademark Klucel. Its solvency in water is very similar to that of methyl cellulose.

Since the primary and secondary laminas of the dressing are both cellulose derivatives and both water-soluble, they are compatible and can be made to adhere face to face into a single coherent laminated structure by merely wetting their confronting faces and pressing them together.

The primary hemostatic layer of the dressing, may be formulated with plasticizers, medicaments and humectants in accordance with anyone of the specific Examples 1–8, inclusive, set forth in the aforesaid application Ser. No. 337,709 and may be aerated and manufactured into porous sheets, films or pads, in a manner disclosed in said application. The thickness of this primary layer depends on the specific part of the body and the character of the wound to which the dressing is to be applied. The physical structure and properties of this primary layer are the same as those disclosed in the aforesaid application Ser. No. 337,709.

The secondary layer to be used as a backing for the dressing, in a specific example, is a methyl cellulose, plasticized with a 30% glycol derivative, such as polyethylene glycol, and formed as a dense film or sheet on a Teflon poly(tetrafluoroethylene) belt. This film or sheet may be thin as 3 to 4 thousandths of an inch thick, or thicker, depending on the degree of containment desired, and its solubility may be varied by the addition of suitable salts or by a variation of its density up to the aerated or porous state.

The primary and secondary layers are assembled by wetting confronting faces of the two layers with water and feeding them through compression rollers, to bring the layers into face to face adhering contact and to form a laminated structure thereby. The contacting faces of the layers will be bonded together by the water serving as the common solvent.

With the laminated dressing described, the primary layer applied directly to a free flowing wound will immediately dissolve in and coagulate the plasma and release its medication, while the secondary backing layer remains to contain any excess plasma flowing from the wound. Eventually, this secondary layer will dissolve in the plasma and be absorbed by the body.

Wtih the laminated dressing described, a wound is protected for prolonged healing, if required, and the life of the dressing before complete absorption in the body, can be controlled in the manufacture of the dressing, by the different factors described.

Although the primary layer is described as being hemostatic, as far as certain aspects of the invention are concerned, it need not be so, as long as it is water-soluble or plasma-soluble, and can serve as a vehicle for medication, released upon dissolution in the plasma.

What is described is:

1. A laminated dressing for a wound comprising a laminated structure made up of two layers arranged face to face, both layers being plasma-soluble, one layer constituting a primary layer adapted to be applied directly to the wound, and being more readily soluble in plasma than the other layer, the other layer constituting a secondary layer serving as a backing for said primary layer.

2. A laminated dressing as described in claim 1, the primary layer carrying a medicament.

3. A laminated dressing as described in claim 1, the primary layer containing a hemostatic agent.

4. A laminated dressing as described in claim 1, the two layers constituting essentially cellulose derivatives.

5. A laminated dressing as described in claim 1, the primary layer containing a hemostatic agent of the class consisting of sodium salt of carboxymethyl cellulose, and hydroxy ethyl cellulose.

6. A laminated dressing as described in claim 5, the primary layer being in porous form.

7. A laminated dressing as described in claim 1, said secondary layer being in dense form.

References Cited

UNITED STATES PATENTS 3,328,259    6/1967    Anderson _____ 167—84

FOREIGN PATENTS 121,334    5/1946    Australia _____ 167—84

ALBERT T. MEYERS, Primary Examiner

A. J. ROBINSON, Assistant Examiner

U.S. Cl. X.R.

424—35